(12) United States Patent
Greenblatt

(10) Patent No.: US 7,537,182 B2
(45) Date of Patent: May 26, 2009

(54) SIMULTANEOUS MULTIPLE-LOCATION SEPARATION CONTROL

(75) Inventor: David Greenblatt, Newport News, VA (US)

(73) Assignee: The United States of America as represented by the Administrator of the National Aeronautics and Space Administration, Washington, DC (US)

(\*) Notice: Subject to any disclaimer, the term of this patent is extended or adjusted under 35 U.S.C. 154(b) by 634 days.

(21) Appl. No.: 11/250,700

(22) Filed: Sep. 22, 2005

(65) Prior Publication Data

US 2006/0060723 A1  Mar. 23, 2006

Related U.S. Application Data

(60) Provisional application No. 60/615,210, filed on Sep. 23, 2004.

(51) Int. Cl.
*B64C 21/10* (2006.01)

(52) U.S. Cl. .................................... 244/200.1; 137/831

(58) Field of Classification Search .................. 244/1 R, 244/207, 208, 213, 199.1, 200.1; 137/831
See application file for complete search history.

(56) References Cited

U.S. PATENT DOCUMENTS

| 5,398,885 | A | * | 3/1995 | Andersson et al. | .......... 244/1 R |
| 5,983,944 | A | * | 11/1999 | Niv | .......................... 137/831 |
| 6,543,719 | B1 | * | 4/2003 | Hassan et al. | ............ 244/17.13 |
| 6,821,090 | B1 | * | 11/2004 | Hassan et al. | ................. 416/42 |

\* cited by examiner

*Primary Examiner*—Timothy D Collins
(74) *Attorney, Agent, or Firm*—Barry V. Gibbens; Linda B. Blackburn

(57) ABSTRACT

A method of controlling a shear layer for a fluid dynamic body introduces first periodic disturbances into the fluid medium at a first flow separation location. Simultaneously, second periodic disturbances are introduced into the fluid medium at a second flow separation location. A phase difference between the first and second periodic disturbances is adjusted to control flow separation of the shear layer as the fluid medium moves over the fluid dynamic body.

10 Claims, 2 Drawing Sheets

SIMULTANEOUS MULTIPLE-LOCATION SEPARATION CONTROL

Pursuant to 35 U.S.C. §119, the benefit of priority from provisional application 60/615,210, with a filing date of Sep. 23, 2004, is claimed for this non-provisional application.

ORIGIN OF THE INVENTION

The invention described herein may be manufactured and used by or for the Government of the United States of America for governmental purposes without the payment of any royalties thereon or therefor.

BACKGROUND OF THE INVENTION

1. Field of the Invention

This invention relates to control of shear layer separation. More specifically, the invention is a method of shear layer separation control for a fluid dynamic body via the simultaneous introduction of perturbations at multiple flow separation locations on the body.

2. Description of the Related Art

As a flow of a fluid (e.g., air, water, etc.) moves over a body, a boundary or shear layer of the flow separates from the body. It has been found that control of shear layer separation can be used to alter the body's aerodynamics or hydrodynamics. Such separation control is achieved by incorporating one or more separation control devices (SCDs) into the body and operating them in accordance with a particular scheme. For example, U.S. patent application Publication No. 2005/0103944 addresses wake turbulence by mounting flaps and SCDs on the trailing edge of a wing. The SCDs are operated to vary the properties of the vortices generated (as a result of the separated shear layer) at the trailing edge of the deflected flaps. Thus, the use of SCDs is promising as a means to improve aerodynamic or hydrodynamic performance.

SUMMARY OF THE INVENTION

Accordingly, it is an object of the present invention to provide a method of controlling a shear layer.

Another object of the present invention is to provide a method of controlling an airflow's shear layer moving over an airfoil.

Still another object of the present invention is to provide a method of using separation control devices to improve aerodynamic performance of an airfoil.

Other objects and advantages of the present invention will become more obvious hereinafter in the specification and drawings.

In accordance with one aspect of the present invention, a method of controlling a shear layer is provided for a fluid dynamic body that defines at least two shear layer flow separation locations as a fluid medium moves thereover. First, periodic disturbances are introduced into the fluid medium at a first of the flow separation locations where the first periodic disturbances are defined by a first frequency and a first phase. Simultaneously, second periodic disturbances are introduced into the fluid medium at a second of the flow separation locations where the second periodic disturbances are defined by a second frequency and a second phase that is different than the first phase. As a result, a phase difference is defined between the first and second phases. The second frequency is an integer multiple of the first frequency. The phase difference is adjusted to control flow separation of the shear layer as the fluid medium moves over the fluid dynamic body.

In accordance with another aspect of the present invention, a method of controlling a shear layer is provided for a fluid dynamic body that defines at least one shear layer flow separation location as a fluid medium moves thereover. First, periodic disturbances are introduced into the fluid medium at a first flow separation location where the first periodic disturbances are defined by a first frequency and a first phase such that the fluid flow separates from the fluid dynamic body at a second flow separation location aft of the first flow separation location. Simultaneously, second periodic disturbances are introduced into the fluid medium at the second flow separation location where the second periodic disturbances are defined by a second frequency and a second phase that is different than the first phase. As a result, a phase difference is defined between the first and second phases. The second frequency is an integer multiple of the first frequency. The phase difference is adjusted to control flow separation of the shear layer as the fluid medium moves over the fluid dynamic body.

DETAILED DESCRIPTION OF THE INVENTION

Figure 1:
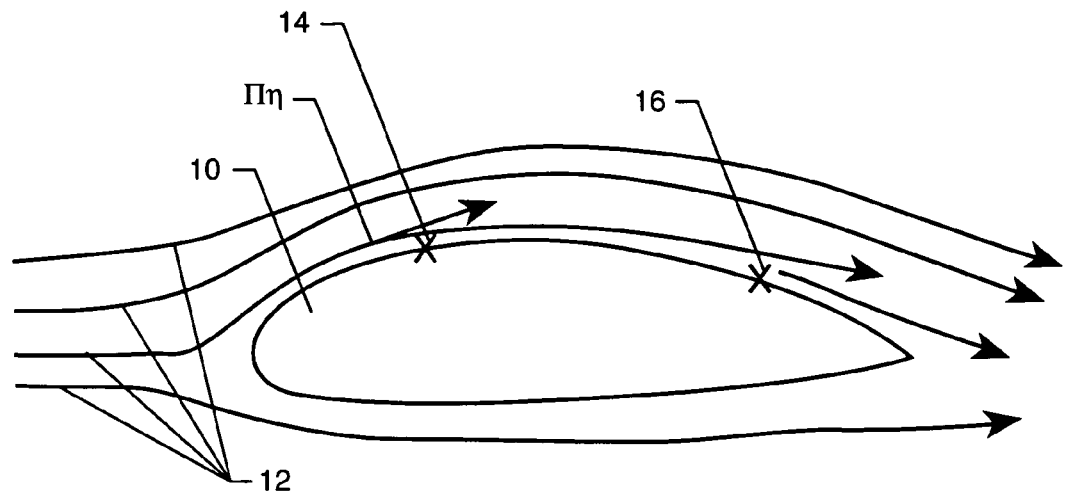
FIG. 1 is a schematic view of a fluid dynamic body in a flowing fluid medium.

Referring now to the drawings and more particularly to FIG. 1, a body 10 having fluid dynamic properties is illustrated in a flow of a fluid medium (e.g., air, water, etc.) referenced by flow lines 12. Body 10 can be designed for aerodynamic performance or hydrodynamic performance without departing from the scope of the present invention. As is well known in the art, as fluid flow 12 moves over body 10, layer(s) of fluid flow 12 close to body 10 are known as the boundary or shear layer(s) 12A. Depending on the design of body 10, shear layer 12A can separate from body 10 at one or more locations. In general, the present invention is designed to control separation when a fluid flow separates from a fluid dynamic body at one or more separation locations as a fluid flow moves thereover. For example, in the illustrated example, shear layer 12A separates at a forward location 14, reattaches to body 10 aft of location 14, and separates again at an aft location 16. It is to be understood that body 10 and its separation locations 14 and 16 are shown merely for illustration and are not to be considered limitations of the present invention. In another possible scenario, the fluid flow initially separates from the body and experiences subsequent reattachment and a second separation (aft of the initial separation location) only after the flow is perturbed at the initial separation location in accordance with the present invention.

Figure 2:
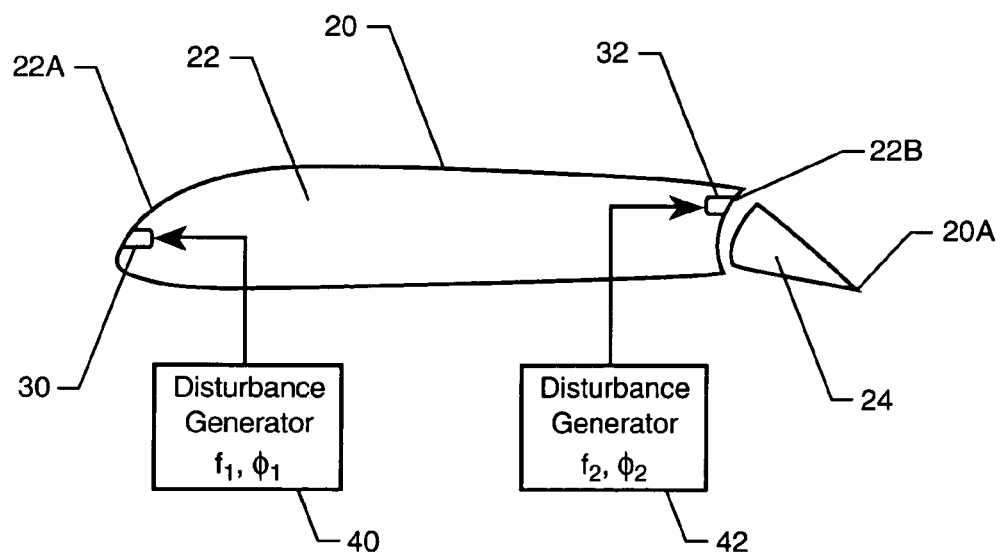
FIG. 2 is a schematic view of an airfoil configured for multiple-separation control in accordance with an embodiment of the present invention.

By way of example, FIG. 2 illustrates an airfoil 20 configured with a separation control system for implementing the present invention. However, as previously mentioned, the present invention can be implemented for any fluid dynamic body that will be disposed in the flow of a fluid medium. Airfoil 20 has a main body 22 that defines a leading edge 22A of airfoil 20. Hingedly coupled to the aft end of main body 22 at a flap shoulder 22B is a deflectable flap 24 (shown in its deflected position), the trailing edge of which defines the trailing edge 20A of airfoil 20. The means for coupling flap 24 to main body 22 and the means for deflecting flap 24 are well known in the art and need not be described further herein.

Figure 3:
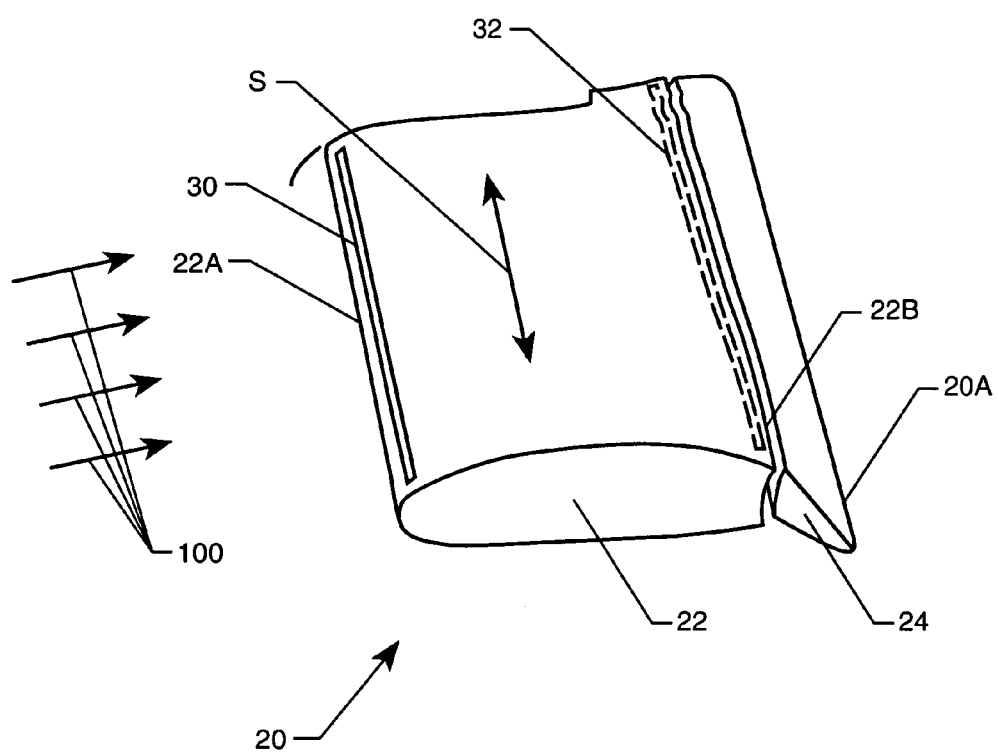
FIG. 3 is a perspective view of a portion of the airfoil configured as in FIG. 2 illustrating a distribution of the separation control devices at two locations on the airfoil.

Mounted at leading edge 22A are leading edge separation control devices (SCDs) 30. Mounted at flap shoulder 22B are flap shoulder SCDs 32. As is known in the art, SCDs 30 and 32 are configured and operated to introduce perturbations into an airflow moving over airfoil 20. SCDs 30 and 32 can be realized by air blowing/sucking devices, surface mounted flapping devices, or a combination of these types of devices. For example, in terms of blowing/sucking devices, SCDs 30 and 32 can be realized by continuous or nearly continuous slots formed in the skin of airfoil 20 with an oscillating air pressure source (not shown) coupled thereto. Referring additionally now to FIG. 3, a portion of airfoil 20 is shown in a perspective view with its spanwise direction indicated by the two-headed arrow referenced by the letter "S". SCDs 30 are positioned in spanwise direction S along at least a portion of leading edge 22A while SCDs 32 are positioned in spanwise direction S along at least a portion of flap shoulder 22B that is aligned aft of SCDs 30 with respect to the direction of an airflow 100. Similar to the scenario in FIG. 1, as airflow 100 moves over airfoil 20, a shear layer (not shown in FIGS. 2 and 3 to maintain clarity in the illustrations) will separate from airfoil 20. The present invention controls this separation in order to affect/improve aerodynamic performance of airfoil 20.

Coupled to SCDs 30 is an independently-controllable disturbance generator 40 capable of exciting SCDs 30 such that disturbances are periodically introduced into airflow 100 by SCDs 30. These cyclical disturbances are introduced at a frequency $f_1$ and a phase $\Phi_1$. Similarly, coupled to SCDs 32 is an independently-controllable disturbance generator 42 capable of exciting SCDs 32 such that disturbances are periodically introduced into airflow 100 by SCDs 32. These cyclical disturbances are introduced at a frequency $f_2$ and a phase $\Phi_2$. The periodically-introduced disturbances generate vortices that interact with the airflow and each other to affect aerodynamic performance.

In general, the present invention can be used to affect aerodynamic performance of airfoil 20 when (i) $f_1=nf_2$ where n is a positive integer;

(ii) $\Phi_1 \neq \Phi_2$ such that a phase difference $\Delta\Phi$ results;

(iii) the periodic perturbations are generated simultaneously at SCDs 30 and 32; and (iv) the phase difference $\Delta\Phi$ is adjusted to achieve a desired level of aerodynamic performance.

Note that with SCDs 32 mounted at flap shoulder 22B, flap 24 will typically be deflected (e.g., down as shown) to allow SCDs 32 to perturb the airflow.

In the illustrated configuration, several additional conditions provide greater levels of separation control for aerodynamic performance modification. These conditions include the following:

(i) The reduced excitation or dimensionless frequency $F^+$ should fall approximately within the range of $0.3<F^+<3$. The dimensionless frequency for the leading edge $F^+_{LE}$ is equal to $f_1 X_{LE}/U$ where $X_{LE}$ is the distance from SCDs 30 to trailing edge 20A, and U is the freestream velocity of airflow 100. The dimensionless frequency for the flap shoulder $F^+_{FS}$ is equal to $f_2 X_{FS}/U$ where $X_{FS}$ is the distance from SCDs 32 to trailing edge 20A.

(ii) The amplitude of the disturbances produced by each of SCDs 30 and 32 should be substantially the same along the span of the airfoil so that the amplitude profile is essentially two-dimensional at leading edge 20A and flap shoulder 22B.

(iii) The amplitude of the disturbances produced by SCDs 30 should be large enough so that the resulting spanwise vortices or shear layer oscillations are sustained long enough to interact with the vortices generated by SCDs 32.

Surface pressure and flowfield measurements made when testing the illustrated configuration showed that the simultaneous multiple-location separation control combined with adjusting the phase difference $\Delta\Phi$ between separation control locations are important factors in aerodynamic performance control. For the illustrated configuration using blowing/sucking SCDs, lift is maximized when the phase difference $\Delta\Phi$ is adjusted so that the airflow's shear layer is closest to flap 24 when SCDs 32 are at their peak of suction. While good results are obtained provided $f_1=nf_2$, the best results are obtained when $f_1=f_2$, and when $X_{LE}=2X_{FS}$ (i.e., allows the dimensionless frequency $F^+_{LE}$ and $F^+_{FS}$ to be based on an identical frequency of perturbation introduction).

The present invention can achieve aerodynamic performance modification when the periodic disturbances at each of SCDs 30 and 32 are zero net-mass-flux or non-zero net-mass-flux. Further, SCDs 30 and 32 could be used in combination to produce an overall zero or non-zero net-mass-flux (e.g., applying net blowing at the leading edge and net suction at the flap shoulder).

The advantages of the present invention are numerous. Aerodynamic performance (e.g., lift) is modified through simultaneous multiple-location separation control. Once the system is configured for a particular fluid dynamic body, performance can be changed simply by adjusting a phase difference between the separation control devices.

Although the invention has been described relative to a specific embodiment thereof, there are numerous variations and modifications that will be readily apparent to those skilled in the art in light of the above teachings. For example, the simultaneous multiple-location separation control of the present invention can be applied at multiple locations on any airfoil, wing or fluid dynamic body that has two or more separation locations as a fluid medium flows thereover. Some examples of other fluid dynamic bodies that could benefit from the present invention include a circulation controlled airfoil, an airfoil with a downwardly-inclined or drooped leading edge and a trailing edge flap, an airfoil with a leading edge flap and a trailing edge flap, irregularly-shaped airfoils having relatively sharp edges or a very high degree of curvature, or any general aerodynamic or hydrodynamic body having two or more separation locations defined thereby as a fluid medium flows thereover. It is therefore to be understood that, within the scope of the appended claims, the invention may be practiced other than as specifically described.

What is claimed as new and desired to be secured by Letters Patent of the United States is:

1. A method of controlling the shear layer of an airflow, comprising the steps of:

providing an airfoil having (i) a main body defining a leading edge with first separation control devices (SCDs) distributed along at least a portion of the leading edge, and (ii) a flap hingedly coupled to the main body at a flap shoulder and defining a trailing edge of the airfoil with second separation control devices (SCDs) distributed along at least a portion of the flap shoulder that is aligned with said portion of the leading edge with respect to the direction of the airflow;

deflecting the flap into the airflow;

simultaneously introducing periodic disturbances into the airflow moving over the airfoil at both the leading edge and at the flap shoulder using the first SCDs and second SCDs, respectively, wherein said periodic disturbances introduced at the leading edge have substantially the same amplitude all along said portion of the leading edge, said periodic disturbances having a dimensionless frequency $F^+$ that satisfies the relationship $0.3 \leqq F^+ \leqq 3$, said periodic disturbances generating vortices in the airflow wherein the vortices generated at the leading edge interact with the vortices generated at the flap shoulder; and adjusting a phase difference between said periodic disturbances simultaneously introduced into the airflow at both the leading edge and at the flap shoulder to vary lift on the airfoil.

2. A method according to claim 1 wherein said periodic disturbances at both the leading edge and at the flap shoulder are created by alternately blowing air out of the airfoil and sucking air into the airfoil.

3. A method according to claim 2 wherein a shear layer of the airflow develops over the airfoil as the airflow moves thereover, and wherein said step of adjusting comprises the step of controlling said phase difference such that air is being sucked into the airfoil at the flap shoulder when the shear layer of the airflow is closest to the flap so-deflected.

4. A method according to claim 1 wherein a frequency of said periodic disturbances produced by the second SCDs is an integer multiple of a frequency of said periodic disturbances produced by the first SCDs.

5. A method according to claim 4 wherein said integer multiple is one.

6. A method according to claim 1 wherein said periodic disturbances produced by the first SCDs are zero net-mass-flux.

7. method according to claim 1 wherein said periodic disturbances produced by the first SCDs are non-zero net-mass-flux.

8. A method according to claim 1 wherein said periodic disturbances produced by the second SCDs are zero net-mass-flux.

9. A method according to claim 1 wherein said periodic disturbances produced by the second SCDs are non-zero net-mass-flux.

10. A method according to claim 1 wherein a distance between the first SCDs and the trailing edge of the airfoil is approximately twice that of a distance between the second SCDs and the trailing edge of the airfoil.

* * * * *